United States Patent [19]

Jones

[11] 3,781,191
[45] Dec. 25, 1973

[54] NUCLEAR CONTROL ROD HAVING EMBEDDED FILAMENTS
[75] Inventor: Cecil R. Jones, Hamden, Conn.
[73] Assignee: Transfer Systems Incorporated, New Haven, Conn.
[22] Filed: Feb. 22, 1972
[21] Appl. No.: 228,067

[52] U.S. Cl............ 176/86 R, 176/93, 75/DIG. 1
[51] Int. Cl............................................. G21c 7/10
[58] Field of Search .............. 176/86 R, 93, 93 BD; 75/DIG. 1, 202

[56] References Cited
UNITED STATES PATENTS
| 3,419,952 | 1/1969 | Carlson | 75/DIG. 1 |
| 3,432,295 | 3/1969 | Frank et al. | 75/DIG. 1 |
| 3,450,510 | 6/1969 | Calow | 75/DIG. 1 |
| 3,245,782 | 4/1966 | Ray | 176/93 R |
| 3,103,478 | 9/1963 | Kooistra | 176/86 R |
| 3,141,227 | 7/1964 | Klepfer et al. | 176/86 R |
| 2,990,360 | 6/1961 | Porembka, Jr. | 75/202 |

FOREIGN PATENTS OR APPLICATIONS
| 239,914 | 12/1960 | Australia | 176/86 R |

OTHER PUBLICATIONS
DMIC, Review of Recent Developments, Fiber–Reinforced Metals, 7/16/69, pp. 1–6, by K. R. Hanby (I).
DMIC, Review of Recent Developments, Fiber–Reinforced Metals, 10/22/69, pp. 1–3, by K. R. Hanby (II).
Time Magazine, Oct. 1967, pp. 1,2, "Stronger than Steel, Lighter than Aluminum: A report from General Dynamics."

Primary Examiner—Harvey E. Behrend
Attorney—Jack Oisher

[57] ABSTRACT
A nuclear reactor control rod for regulating or shutting-down the power of a nuclear reactor is described. The control rod features filaments of a neutron absorber bonded together and to a foil backing to form a sheet. Plural sheets are laminated to form a plate, and plural plates may be joined together in a cruciform shape. A preferred method to make such a control comprises forming the sheets by plasma-spraying a corrosion-resistant metal to bond the filaments to the foil backing.

8 Claims, 4 Drawing Figures

PATENTED DEC 25 1973 3,781,191

NUCLEAR CONTROL ROD HAVING EMBEDDED FILAMENTS

This invention relates to control rods for regulating or shutting-down the power of a nuclear reactor.

As is known, control rods are used to control the power of a nuclear reactor. They generally comprise a strong neutron absorber like boron, hafnium or cadmium. A plurality of control rods are distributed throughout the reactor core between the fuel assemblies which represent neutron sources in order to absorb neutrons and prevent them from causing further fissions. In light water reactors of the boiling water type (BWR), they typically are of the blade type having a cruciform shape and are positioned between a group of four assemblies. In pressurized water reactors (PWR) they have a rod-like shape and are suspended from a common support so as to move within hollow guide tubes of a single fuel assembly.

Various constructions of such control rods are known. For example, the rod may be of solid metal, such as boron-stainless steel, or of a corrosion-resistant hollow sheath containing boron or boron-carbide powder. A popular construction of the blade-type comprises a welded sheath having a cruciform cross-section filled with two crossing rows of absorber rods consisting of boron carbide in stainless steel tubes.

Certain problems are encountered in the construction and use of these known structures. With the solid metal rod, the boron content must be kept low to avoid excessive brittleness. With the sheathed structure, higher boron contents become possible, but during burnup, gas is generated within the boron or like absorber. The increased boron aggregation can result in the build up of excessive gas pressure which can cause failure of the enclosing sheath and leaching out of the poison by the coolant. Another disadvantage of the sheathed structure is an increase in the resultant size of the control rod, which therefore requires increased spacing between the fuel assemblies or elements and increased reactor size for the same fuel content. Still a further disadvantage is the high cost of such sheath enclosed absorber rods due to the complex construction and need to ensure a sturdy structure which will safely enclose the absorber rods.

An object of the invention is an improved control rod for a nuclear reactor of sturdy yet low cost construction.

A further object of the invention is an improved control rod having a large amount of absorber material distributed in relatively small enclosed aggregations throughout the structure and spaced from the control surfaces in a structurally sound and safe manner.

Another object of the invention is a blade-type control rod providing a relatively large absorber content in a relatively small thickness allowing closer spacing of fuel assemblies.

These and other objects of the invention are achieved with a control rod construction characterized by a plurality of thin filaments of neutron absorber material embedded in and bonded to one another and conjointly to a foil backing by corrosion resistant material to form a thin sheet. Plural such sheets are laminated to form a flat plate. The plate can then be shaped to the final configuration desired. To form a cruciform, it is preferred to unite four such plates pre-formed into an L-shape.

The advantages obtainable include a sturdy, structurally sound construction, low-cost manufacture, a larger weight of absorber material present for a smaller blade thickness than the known sheath-enclosed rod control, smaller gas pressure due to small filament size and embedment in the bonding material, and complete separation of the absorber from the control surfaces.

These and other advantages as will appear hereinafter will be better understood from the following detailed description of several embodiments of the invention taken in conjunction with the accompanying drawing wherein:

FIGS. 2 and 4 illustrate steps in the construction of the control rod illustrated in FIG. 1 of which FIG. 2 is a cross-section of a small part of the foil-backed embedded filament sheet, and FIG. 4 is a cross-section of the plate made up of plural sheets of the type depicted in FIG. 1;

Figure 1:
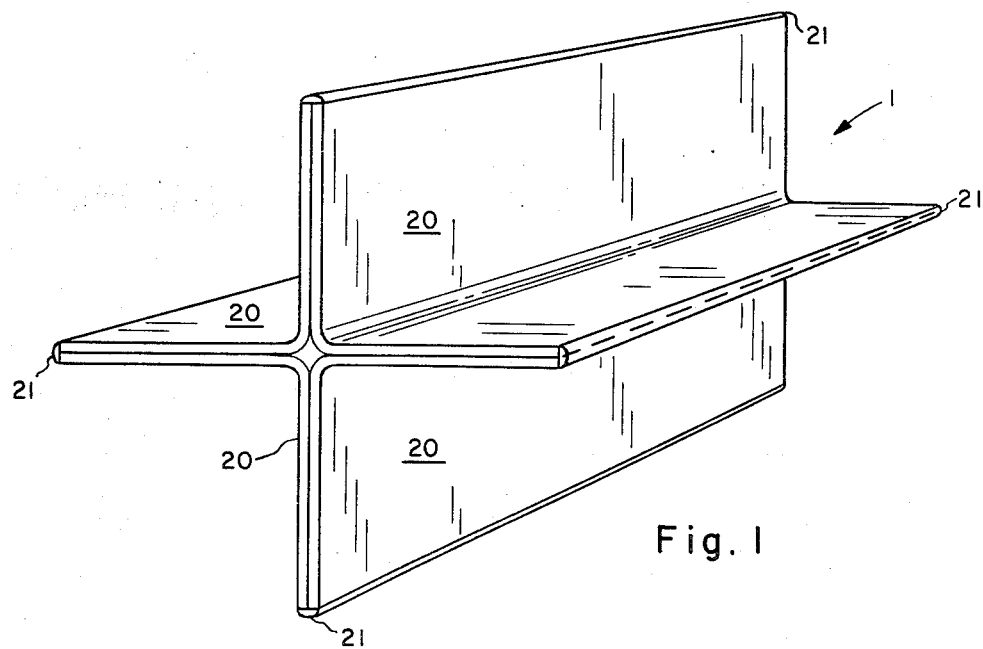
FIG. 1 is a perspective view of one form of control rod construction in accordance with the invention but without the usual handle or support and auxiliary structure normally associated therewith to control its movement within the reactor core.

As explained above, a typical BWR employs a core made up of plural fuel assemblies grouped in sets of four with a cruciform control rod disposed within each set for regulating the power output. A cruciform control rod 1 in accordance with the invention is illustrated in FIG. 1. Not shown are the usual handle or support for the control rod usually affixed at one end serving as the top, and the usual movement control means normally located at the opposite bottom end.

Figure 2:
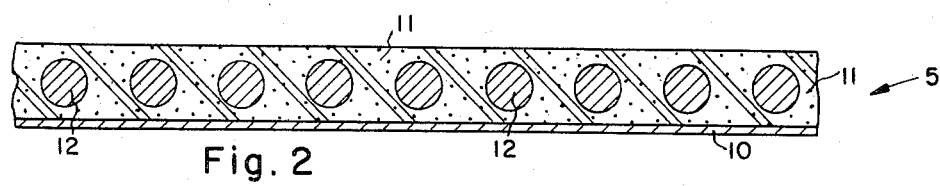
Figure 3:
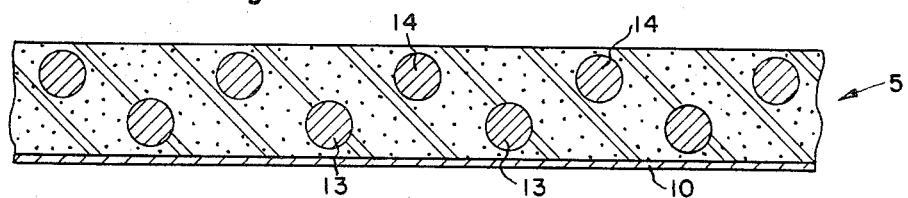
FIG. 3 is a cross-section of a modification of the foil backed sheet.
Figure 4:
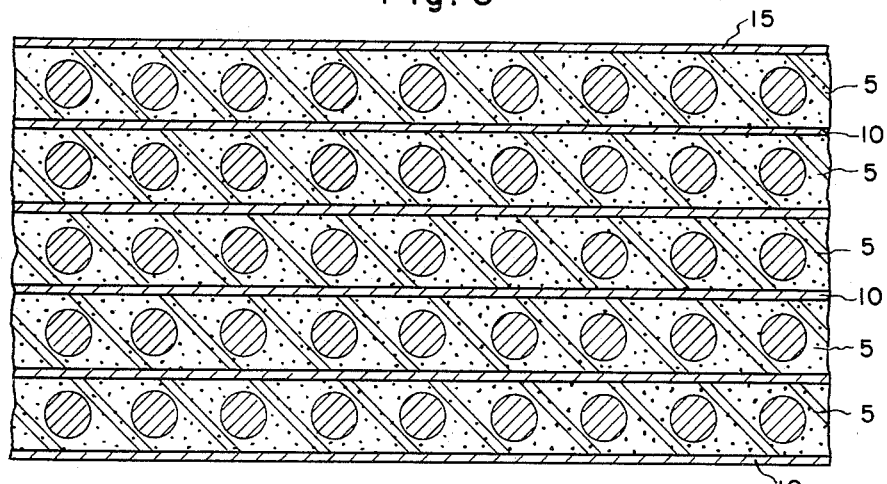

The construction of the control rod 1 will be better understood by reference to FIGS. 2–4.

FIG. 2 is an enlarged cross-section of part of a thin sheet 5 constituting the basic building block of a control rod in accordance with the invention. It comprises a thin foil backing 10 of suitable corrosion resistant material, as for example of stainless steel or zirconium. A corrosion-resistant metal layer 11, as for example of stainless steel or zirconium, is bonded to the foil backing 10. A plurality of thin elongated filaments 12 of neutron-absorber material, eg. boron, are embedded in the metal layer 11. The boron filaments 12 may be arranged to lie in a common plane in spaced parallel relationship. Alternatively, as illustrated in FIG. 3, the filaments may be arrayed in two planes slightly spaced from one another, one row of filaments being designated 13, and the other row of filaments 14. The latter arrangement provides for an increased filament content at the expense of a small increase in sheet thickness. The filaments 12 extend the full length of the sheet, which is the dimension perpendicular to the plane of the drawing.

The sheets depicted in FIGS. 2 and 3 may be constructed in various ways. A preferred method is to orient the filaments relative to the foil backing, and then vapor deposit the layer material until the filaments are bonded to the foil and to one another and are fully embedded in the layer material as illustrated. A suitable method of vapor deposition for stainless steel is plasma spraying of molten metal, which is a well known technique. While the filaments may be constituted of any known strong absorber material, I prefer to use boron. Boron filaments are available from commercial suppliers. As one example of a particularly suitable arrangement, which is not intended to be limiting, the boron filaments have a diameter of about 0.005 inches, the stainless steel foil a thickness of about 0.003 inches, the filaments in the FIG. 2 embodiment are spaced apart (spacing between their outer surfaces) a distance of about 0.002 inches, and the thickness of the metal layer above and below the filaments is also about 0.002 inches. This makes for a flexible sheet 5 having a total thickness of about 0.012 inches. As an alternative method, each of the filaments may first be coated with stainless steel by vapor deposition, then the precoated filaments arrayed in closs packed fashion in the foil backing, and finally the stainless steel vapor deposited to bond the assembly into an integral unit. The strength of the sheet is provided mainly by the foil backing. It will also be observed that the absorber filaments are spaced by a certain thickness of corrosion resistant material from the sheet surface, and by choosing a suitable length can be spaced from the sheet edges. Hence, if boron diffusion does take place when heat is applied, the formation of a boron-stainless alloy will be confined to the layer regions immediately surrounding the filaments leaving pure stainless steel at the surfaces.

The next step in the process is to form a rigid plate by laminating a plurality of the sheets depicted in FIGS. 2 and 3. This is illustrated in FIG. 4. A plurality of the sheets or plies 5 are laid one on top of the other such that the foil backing 10 of each of the intermediate sheets contacts the layer 11 of the adjacent sheet just below. To complete the assembly, a cover foil 15 similar to the foil backing 10 is located on top of the uppermost ply. Then the sheets are bonded together in any well known manner. Preferred methods are to apply pressure and heat to diffusion bond or to braze bond the layers together. To ensure solid bonding, the contacting surfaces are thoroughly cleaned and the bonding takes place in high vacuum to avoid oxidation. As one example, not to be limiting, about twenty such sheets may be laminated to form a strong rigid plate having a thickness of about 0.27 inches. For a typical BWR blade type of control, the plate length may be 144 inches, and the plate width 20 inches.

To form a cruciform, four plates, designated 20, formed as described above are then each bent about an axis in their longitudinal direction to form an L-shape as depicted in FIG. 1, each arm of the L, for the example given, having a length of about 10 inches. Then the four L-shaped members are assembled as shown in FIG. 1 and joined together, as for example by brazing or welding the abutting long edges, as depicted at 21. Subsequently, the handle and associated parts, not shown, are affixed. If desired, stainless steel strips may be brazed along all the exposed edges to seal them off.

As will be observed, the completed construction, though inexpensive to manufacture, provides a strong, sound structure with the absorber material safely embedded in and spaced from the surface by the vapor-deposited corrosion-resistant material. The aggregation of the absorber is low, as the absorber is present in thin spaced filaments. Thus the gas generated during burnup will be at a low pressure. Moreover, it is surprisingly found that, compared with the known construction of tube enclosed boron carbide in a stainless steel sheath, the total quantity of abosrber present in the control of the invention is substantially increased (approximately 20 percent for the example given) for the same blade thickness, or for the same absorber content, the blade thickness can be reduced. In the latter case, this means that the fuel assemblies can be spaced closer together reducing the reactor size for the same fuel content, or increasing the fuel content for the same reactor size. Another advantage over the aforesaid known construction is that absorber material is present at the center of the cruciform, which was not the case for the known construction.

While the manufacture of one exemplary embodiment of the invention has been described in detail, it will be understood that the invention is not limited thereto. For example, the sheets need not be arranged so that the filaments all extend parallel, but alternate sheets can be arranged so that the filaments extend at right angles to the filaments in adjacent sheets. Also, the blade need not have a cruciform shape and other known configurations are equally feasible. Cylindrical rods can also be formed by rolling individual sheets or laminated sheets into a cylinder and brazing the outer edge. The L-shape can be formed by brazing or welding two smaller flat plates rather than by folding.

The sheet and plate making oeprations need not be separated and can be combined. For example, one can start with the boron filaments precoated by plasma-spraying with stainless steel. Next, an assembly is made up in vacuum of foil backings alternating with layers of the coated filaments, after which the edges of the assembly are seal welded tight, as by electron-beam welding. Then, the welded assembly is subjected to hot-rolling until a small reduction in size is obtained, the combined heat and pressure of the hot-rolls serving to bond the layers together to form the desired laminated plate. The plasma-sprayed metal is never 100 percent dense and thus small voids are always present which can absorb some of the gas generated during poison burnup. The embedments for the filaments provide small pressure vessels for the poison in comparison with the known structure.

While the principles of the invention have now been made clear in several illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a nuclear reactor containing a coolant, a control element for absorbing neutrons comprising at least one lamina of opposed foil sheets and between the foil sheets a plurality of elongated filaments and metal bonding the elongated filaments to one another and to the foil sheets to form an integral structure, said foil sheets and said bonding metal consisting essentially of stainless steel or zirconium and being capable of resisting corrosion when immersed in the nuclear reactor coolant, said elongated filaments consisting essentially of material capable of high absorption of neutrons compared with that of the foil sheets and bonding metal.

2. The invention as claimed in claim 1 wherein the high absorption material is one of boron, hafnium and cadmium.

3. A control rod element as claimed in claim 2 wherein the filaments are each spaced from the foil sheets by bonding metal.

4. A control rod element as claimed in claim 3 wherein the coolant is water.

5. A control rod element as claimed in claim 4 wherein the element comprises plural said lamina bonded together by said bonding metal to form a plate-like member.

6. A control element as claimed in claim 5 wherein the said bonded metal is less than 100% dense.

7. A control element as claimed in claim 6 wherein the element has a cruciform shape made up of plural of said plate-like members joined together.

8. The invention as claimed in claim 4 wherein the filaments are of boron with a diameter of about 0.005 inches.

* * * * *